United States Patent
Sasidharan et al.

(10) Patent No.: US 11,093,216 B2
(45) Date of Patent: Aug. 17, 2021

(54) AUTOMATIC DISCOVERY OF MICROSERVICES FROM MONOLITHIC APPLICATIONS

(71) Applicant: International Business Machines Corporation, Armonk, NY (US)

(72) Inventors: Rejy Sasidharan, Bangalore (IN); Santanu Bandyopadhyay, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 59 days.

(21) Appl. No.: 16/509,179

(22) Filed: Jul. 11, 2019

(65) Prior Publication Data

US 2021/0011688 A1 Jan. 14, 2021

(51) Int. Cl.
*G06F 8/76* (2018.01)
*G06F 9/44* (2018.01)
(Continued)

(52) U.S. Cl.
CPC ............... *G06F 8/10* (2013.01); *G06F 8/20* (2013.01); *G06F 8/36* (2013.01); *G06F 8/38* (2013.01);
(Continued)

(58) Field of Classification Search
CPC ..... G06F 8/10; G06F 8/36; G06F 8/60; G06F 8/427; G06F 8/20; G06F 8/76; G06F 8/65;
(Continued)

(56) References Cited

U.S. PATENT DOCUMENTS 9,652,214 B1 * 5/2017 Eberlein ............. G06F 9/44526
10,628,152 B2 * 4/2020 Chandramouli .......... G06F 8/76
(Continued)

OTHER PUBLICATIONS

Sinan Eski et al., An Automatic Extraction Approach—Transition to Microservices Architecture from Monolithic Application, May 21-25, 2018, [Retrieved on Feb. 17, 2021]. Retrieved from the internet: <URL: https://dl.acm.org/doi/pdf/10.1145/3234152.3234195> 6 Pages (1-6) (Year: 2018).*

(Continued)

*Primary Examiner* — Anibal Rivera
(74) *Attorney, Agent, or Firm* — Heslin Rothenberg Farley & Mesiti P.C.; Michael A. Petrocelli, Esq.

(57) ABSTRACT

A method, computer program product, and a system to replace monolithic applications with microservices includes a processor(s) obtaining a requirement for the monolithic application. The processor(s) automatically identifies, based on a sentence comprising the requirement, a given component of the monolithic application, based on analyzing the requirement. The processor(s) determines, based on syntax of the sentence, an initial class and a responsibility for the given component. The processor(s) generates a bounded context for the given component, based on analyzing one or more additional sentences comprising the requirement, to identify additional classes beyond the initial class associated with the responsibility in the requirement. The processor(s) identifies, in a microservices architecture executing in a shared computing environment, one or more microservices within the bounded context. The processor(s) generates a stub for use by the user, via the client, for accessing the one or more identified microservices.

18 Claims, 9 Drawing Sheets

(51) Int. Cl.
*G06F 8/41* (2018.01)
*G06F 8/36* (2018.01)
*G06F 8/10* (2018.01)
G06F 8/20 (2018.01)
G06F 8/61 (2018.01)
G06F 8/38 (2018.01)
G06F 8/65 (2018.01)
G06F 8/51 (2018.01)
G06F 8/60 (2018.01)

(52) U.S. Cl.
CPC ............... *G06F 8/427* (2013.01); *G06F 8/51* (2013.01); *G06F 8/60* (2013.01); *G06F 8/63* (2013.01); *G06F 8/65* (2013.01); *G06F 8/76* (2013.01)

(58) Field of Classification Search
CPC ..... G06F 8/63; G06F 8/38; G06F 8/51; G06F 11/3051; G06F 11/3612; G06F 9/5055; G06F 9/455; G06F 9/45558; G06F 9/44526
See application file for complete search history.

(56) References Cited

U.S. PATENT DOCUMENTS

| | | | | |
|---|---|---|---|---|
| 10,637,952 | B1* | 4/2020 | Koenig | H04L 67/2809 |
| 10,656,929 | B2* | 5/2020 | Jamjoom | G06F 11/3612 |
| 10,721,791 | B1* | 7/2020 | Gamliel | H04W 76/36 |
| 2017/0255884 | A1* | 9/2017 | Visvanathan | G06Q 10/067 |
| 2017/0288982 | A1* | 10/2017 | Katsaros | H04L 41/5025 |
| 2018/0088935 | A1* | 3/2018 | Church | G06F 11/3051 |
| 2018/0287883 | A1* | 10/2018 | Joshi | G06F 9/45558 |
| 2018/0309637 | A1* | 10/2018 | Gill | H04L 41/12 |
| 2018/0331905 | A1* | 11/2018 | Toledo | H04L 43/0882 |
| 2018/0349121 | A1 | 12/2018 | Bagarolo et al. | |
| 2018/0357055 | A1* | 12/2018 | Apte | G06F 8/38 |
| 2019/0005163 | A1* | 1/2019 | Farrell | G06F 8/36 |
| 2019/0205106 | A1* | 7/2019 | Sharma | G06F 16/9024 |
| 2019/0235900 | A1* | 8/2019 | Singh | G06F 9/455 |
| 2019/0250912 | A1* | 8/2019 | Gavisiddappa Kodigenahalli | G06F 8/20 |
| 2019/0340684 | A1* | 11/2019 | Belanger | G06N 7/005 |
| 2019/0347083 | A1* | 11/2019 | Goniwada | G06F 11/1482 |
| 2019/0386895 | A1* | 12/2019 | Innes | G06F 9/45558 |
| 2020/0019388 | A1* | 1/2020 | Jaeger | G06F 9/5055 |
| 2020/0042315 | A1* | 2/2020 | Gupta | G06F 8/36 |
| 2020/0042328 | A1* | 2/2020 | Gupta | H04L 67/34 |
| 2020/0112487 | A1* | 4/2020 | Inamdar | H04L 41/082 |
| 2020/0285451 | A1* | 9/2020 | Agarwal | G06F 8/36 |

OTHER PUBLICATIONS

Zhongshan Ren et al., Migrating Web Applications from Monolithic Structure to Microservices Architecture, Sep. 16, 2018, [ Retrieved on Feb. 17, 2021], Retrieved from the internet: <URL: https://dl.acm.org/doi/pdf/10.1145/3275219.3275230> 10 Pages (1-10) (Year: 2018).*

Qing-Hui Ren et al., Method of Refactoring a Monolith into Micro-services, Nov. 2, 2018, [Retrieved on Feb. 17, 2021]. Retrieved from the internet: <URL: http://www.jsoftware.us/vol13/361-JSW15363.pdf> 8 Pages (646-653) (Year: 2018).*

Mell et al., "The NIST Definition of Cloud Computing", National Institute of Standards and Technology, U.S. Dept. of Commerce, NIST Special Publ. 800-145, Sep. 2011, 7 pages.

Fritzsch et al., "From Monolith to Microservices: A Classification of Refactoring Approaches", arXiv:1807.10059v2, 10.1007/978-3-030-06019-0_10, Jan. 24, 2019.

* cited by examiner

AUTOMATIC DISCOVERY OF MICROSERVICES FROM MONOLITHIC APPLICATIONS

BACKGROUND

A monolithic application describes a single-tiered software application in which the user interface and data access code are combined into a single program, from a single platform. A monolithic application is self-contained, and independent from other computing applications. Monolithic applications are sometimes converted for use in a microservice architecture in order to remove resource constraints and dependencies from the original application.

A microservice architecture is a method of developing software systems that enables support for a range of platforms and devices. Because of this cross-platform and cross-device flexibility, this architecture is often utilized in shared computing systems and distributed systems, including in cloud computing systems. A microservice architecture provides a method for developing software applications, which are also referred to herein as information services, as suites of independently deployable, small, modular services, in which each service runs a unique process and communicates through a well-defined, lightweight, mechanism to serve a defined goal. Thus, a microservice architecture can be utilized to deploy multiple services that work together as a unique application. In this architecture, the overall versioning is represented by the sum of the single service code version. The multiplicity of the services provides a cohesive software solution across devices and platforms.

Applications that are offered as services in a shared and/or distributed computing environment can be accessed utilizing tokens to authenticate accesses. The various applications provided in a shared and/or distributed computing environment can be offered as microservices. A benefit of augmenting functionality into microservices, which can be accessed via an application programming interface (API), is that each microservice accessed can represent a distinct component and can be utilized in a manner where each microservice remains completely autonomous and unaware of the functioning of other microservices, while also enabling structural variations between sources and targets. This autonomous framework is referred to as a decoupled architecture. Microservices provided in shared and/or distributed computing environments, including but not limited to, cloud computing environments, can be highly decoupled services that integrate with other microservices and external applications via token authentication and authorization.

SUMMARY

Shortcomings of the prior art are overcome and additional advantages are provided through the provision of a method for automatically identifying microservice for use in place of a monolithic application. The method includes, for instance: obtaining, by one or more processors, a requirement for a monolithic application, wherein the requirement comprises one or more components defining services accessed by a user, via a client computing device, based on launching the monolithic application; automatically identifying, by the one or more processors, based on a sentence comprising the requirement, a given component of the one or more components, based on analyzing the requirement of the monolithic application; determining, by the one or more processors, based on syntax of the sentence, an initial class and a responsibility for the given component; generating, by the one or more processors, a bounded context for the given component based on analyzing one or more additional sentences comprising the requirement to identify additional classes beyond the initial class associated with the responsibility in the requirement; identifying, by the one or more processors, in a microservices architecture executing in a shared computing environment, one or more microservices within the bounded context; and generating, by the one or more processors, a stub for use by the user, via the client, for accessing the one or more identified microservices to perform the services.

Shortcomings of the prior art are overcome and additional advantages are provided through the provision of a computer program product for automatically identifying microservices for use in place of a monolithic application. The computer program product comprises a storage medium readable by a processing circuit and storing instructions for execution by the processing circuit for performing a method. The method includes, for instance: obtaining, by the one or more processors, a requirement for a monolithic application, wherein the requirement comprises one or more components defining services accessed by a user, via a client computing device, based on launching the monolithic application; automatically identifying, by the one or more processors, based on a sentence comprising the requirement, a given component of the one or more components, based on analyzing the requirement of the monolithic application; determining, by the one or more processors, based on syntax of the sentence, an initial class and a responsibility for the given component; generating, by the one or more processors, a bounded context for the given component based on analyzing one or more additional sentences comprising the requirement to identify additional classes beyond the initial class associated with the responsibility in the requirement; identifying, by the one or more processors, in a microservices architecture executing in a shared computing environment, one or more microservices within the bounded context; and generating, by the one or more processors, a stub for use by the user, via the client, for accessing the one or more identified microservices to perform the services.

Methods and systems relating to one or more aspects are also described and claimed herein. Further, services relating to one or more aspects are also described and may be claimed herein.

Additional features are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

Figure 1:
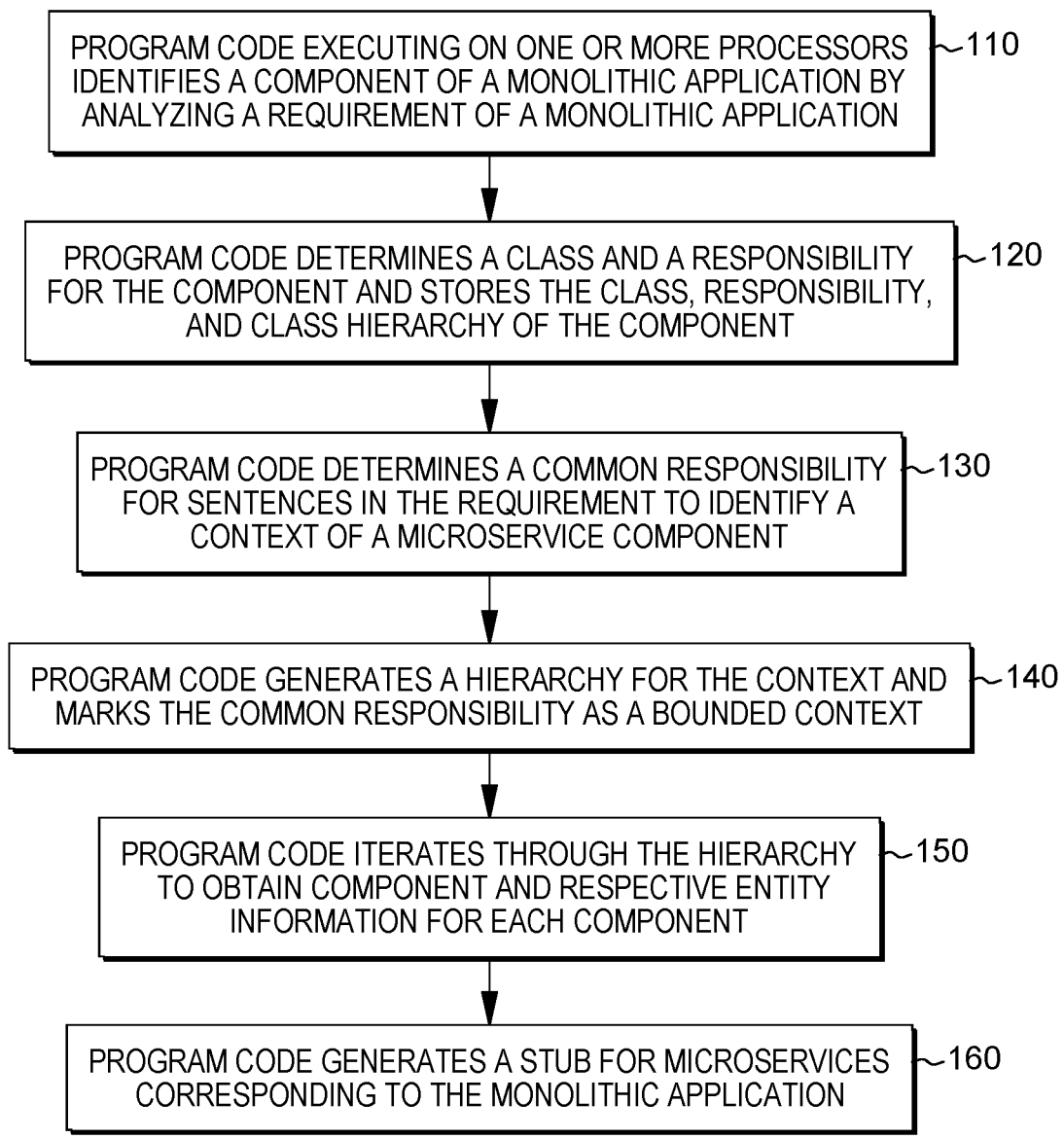
FIG. 1 is a workflow that illustrates certain aspects of some embodiments of the present invention.

The accompanying figures, in which like reference numerals refer to identical or functionally similar elements throughout the separate views and which are incorporated in and form a part of the specification, further illustrate the present invention and, together with the detailed description of the invention, serve to explain the principles of the present invention. As understood by one of skill in the art, the accompanying figures are provided for ease of understanding and illustrate aspects of certain embodiments of the present invention. The invention is not limited to the embodiments depicted in the figures.

Figure 6:
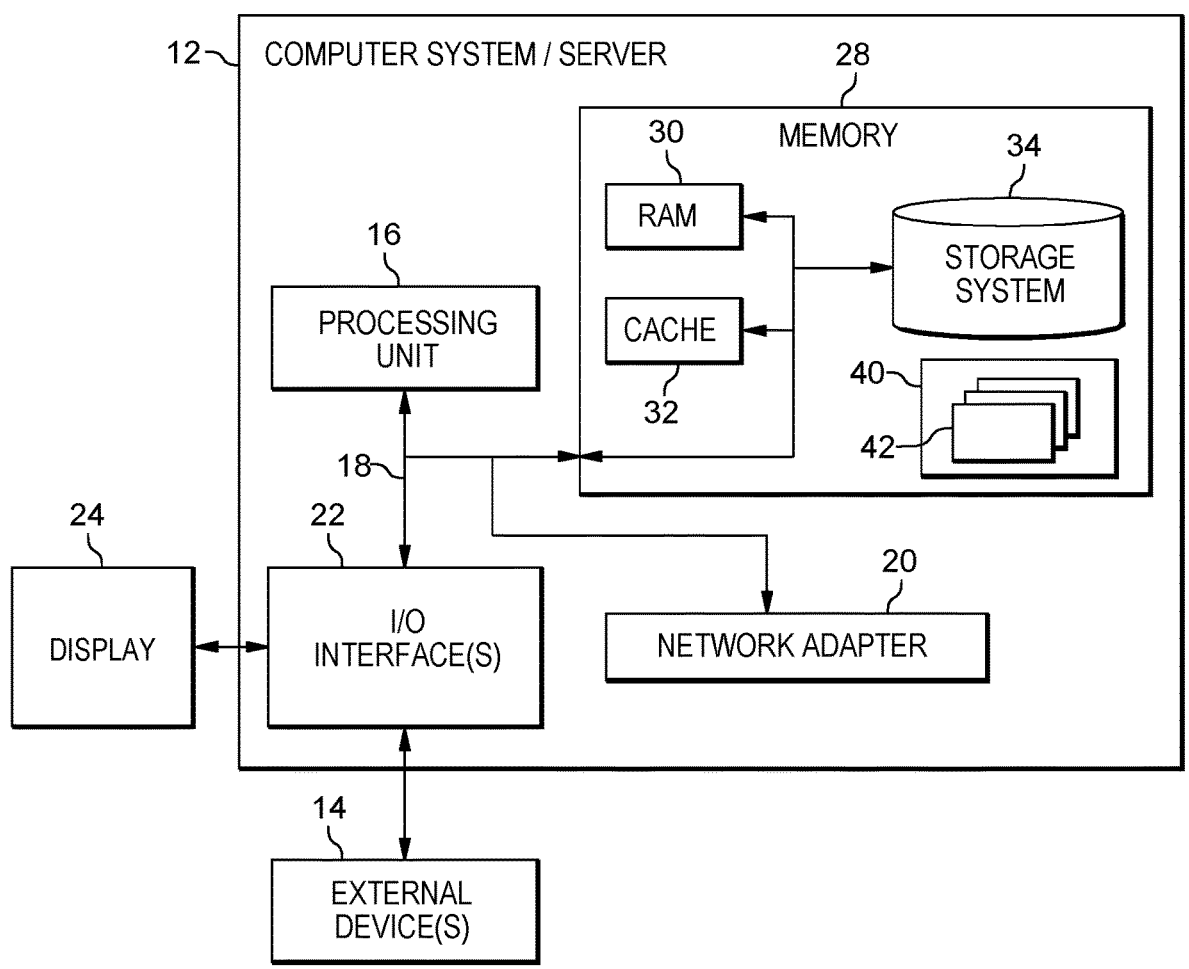
FIG. 6 depicts one embodiment of a computing node that can be utilized in a cloud computing environment.

As understood by one of skill in the art, program code, as referred to throughout this application, includes both software and hardware. For example, program code in certain embodiments of the present invention includes fixed function hardware, while other embodiments utilized a software-based implementation of the functionality described. Certain embodiments combine both types of program code. One example of program code, also referred to as one or more programs, is depicted in FIG. 6 as program/utility 40, having a set (at least one) of program modules 42, may be stored in memory 28.

Embodiments of the present invention include a computer-implemented method, a computer program product, and a computer system where program code executing on at least one processor enables an automatic (e.g., instant, real-time, near real-time, etc.) discovery of one or more microservices belonging to one or more levels of a computing hierarchy that correspond to a monolith application, based on requirements of the monolith application. In some embodiments of the present invention, the program code: 1) obtains the requirements of a monolith application based on cognitively analyzing a requirements document; 2) automatically identifies a bounded content of each microservice corresponding to the monolith application; 3) machine learns (tuning the cognitive analysis) based on feedback from past automatic discoveries of microservices to provide more effective and/or efficient automatic microservice discovery for future monolithic applications.

In some embodiments of the present invention, the program code can cognitively analyze the aforementioned requirements of the monolith application and automatically identify a bounded context of each microservice corresponding to the monolith application from the one or more (legacy) requirements. A bounded context defines the boundaries of the biggest services possible, i.e., services that will not have any conflicting models inside of them. In some embodiments of the present invention, program code analyzes one or more requirements of a monolithic application and automatically identifies bounded context(s) of each of one or more microservices corresponding to the monolith application by utilizing an American Standard Code for Information Interchange (ASCII) based component identifier (e.g., a business component identifier). The component identifier can include a specific dictionary utilized for business component identification, including but not limited to an ASCII specific dictionary. To perform this analysis, in some embodiments of the present invention, the program code utilizes a hash tag hint feature which influences this real-time bounded context identification by the program code, of one or more microservices from the monolith application, to generate the hierarchy for the bounded context. The program code can utilize a business component generator to generate the hierarchy.

The efficacy of the analysis to identify, automatically, microservices that correspond to a given monolith application can be improved over time as the program code obtains suggestions and utilizes these suggestions, which can be provided by a user, to update aspects of the identification program, including but not limited to, the specific dictionary utilized for business component identification (e.g., ASCII specific dictionary). For example, in some embodiments of the present invention, the program code monitors utilization of the identified microservices and captures errors in transactions performed related to the functionality of the original monolithic application. The program code utilizes these captured errors from previous transactions to update a dictionary (e.g., an ASCII dictionary which can be specific to an industry), which is utilized by the program code in some embodiments of the present invention for business component identification.

Embodiments of the present invention are inextricably tied to computing. Aspects of various embodiments of the present invention address a challenge unique to computing, i.e., converting a monolithic application to one or more microservice in a cost and labor-efficient manner. As discussed herein, embodiments of the present invention enable the automatic discovery of microservices with functionality sufficient to be utilized in place of a monolithic application. Both the issue addressed and the solution are inextricably tied to computing in that the issue arises and is unique to computing and the solution utilizes technical aspects of a computing infrastructure. In addition, the functionality of the computer program product, computer system, and computer-implemented method described herein represents a practical application of computing technology, i.e., the automatic discovery of microservices that facilitate the functionality of a monolithic application.

Embodiments of the present invention, which include program code that automatically discovers microservices from a monolith application, represent a significant improvement over the existing approach for identifying/generating microservices to utilize in place of a monolithic application, which is converting monolithic applications to microservices (which is desirable based on architecture limitations inherent in these monolithic applications). In order to convert a monolithic application to microservices (i.e., the existing approach), requirements include: a team of expert of the monolith technology to: 1) analyze existing the legacy system; 2) develop a comprehension of a business flow of the monolithic application; 3) group the business functionality of the monolithic application to identify relevant the microservices and/or microservices modules; and 4) generate a stub for the microservices. A stub is a dummy object that helps in running a test of the microservices because it provides fixed behavior under certain conditions, which can be hard coded. Thus, this existing approach is both time consuming and requires a dependency on a team having competency in a specific technology stack to achieve the migration. Unlike this existing approach, embodiments of the present invention provide a solution to migrate a monolithic application from its requirement by understanding the functional hierarchy of the monolithic application.

For example, in embodiments of the present invention, the program code identifies a component of a monolithic application by analyzing a requirement of the same and stores attributes of the requirement, including but not limited to, a class, responsibility, and class hierarchy information. As discussed in further detail below, the program code utilizes this requirement information to automatically identify a context of a microservice component. Program code in embodiments of the present invention can iterate through the attributes (which the program code can map), to gather additional component and entity data.

FIG. 1 is a workflow 100 that illustrates certain aspects of some embodiments of the present invention. As illustrated in FIG. 1, program code executing on one or more processors identifies, in a shared computing environment, including but not limited to a cloud computing environment, microservices that provide the functionality of a monolithic application. The program code generates a stub to enable a user to access these identified microservices, in the shared computing environment, in a (user-friendly) manner similar to how the user would access (launch) the monolithic application. Referring to FIG. 1, in some embodiments of the present invention, program code executing on one or more processors identifies a component of a monolithic application by analyzing a requirement of a monolithic application (110). The program code can be understood as a business component identifier and in some implementations, it can be ASCII based. The program code can identify the requirement based on analyzing a requirements document of a monolithic application. In some embodiments of the present invention, the program code can utilize an existing cognitive agent to identify one or more requirements of a monolithic application when analyzing a business requirements document or other definitive file or document for the monolithic application. One such cognitive agent that can be utilized in embodiments of the present invention is IBM Watson®. IBM Watson® is a registered trademark of International Business Machines Corporation, Armonk, N.Y., US. For example, in some embodiments of the present invention, the program code interfaces with the application programming interfaces (APIs) that are part of a known cognitive agent, such as the IBM Watson® Application Program Interface (API), a product of International Business Machines Corporation, to classify the content to generate a hierarchy of (business) components representing requirements of a monolithic application. Two APIs that can be utilized in embodiments of the present invention include, but are not limited to IBM Watson® Natural Language Classifier (NLC), and IBM Watson® Natural Language Understanding. As understood by one of skill in the art, the IBM Watson® APIs are only provided to offer an example of possible APIs that can be integrated into embodiments of the present invention and to illustrate the functionality of the program code in embodiments of the present invention, whether through integration of an existing cognitive engine or not. In some embodiments of the present invention, the requirements document is ASCII-based and therefore, the program code that analyzes the requirements document provides an analysis utilizing the ASCII-based format.

Returning to FIG. 1, upon identifying the component of the monolithic application, the program code determines a class and a responsibility for the components and stores the class, responsibility, and class hierarchy of the component in a map (e.g., as a key value pair) (120). The program code determines a common responsibility (e.g., verb) for sentences in the requirement to identify a context of a microservice component (130). The microservice component, scoped by a bounded context, would provide the class and responsibility defined by the requirement, within a hierarchy determined by the program code. Hence, the program code generates a hierarchy for the context and marks the common responsibility (e.g., verb) as a bounded context (140). The program code iterates through the hierarchy (which can comprise another map) to obtain component and respective entity information for each component (150). Based on obtaining the component and respective entity information, the program code generates a stub for microservices corresponding to the monolithic application (160). In some embodiments of the present invention, the program code selected an intent during execution of the stub.

FIG. 1 illustrates how program code in embodiments of the present invention can identify a bounded context and define a service cognitively (140-150). This automated aspect excludes the need for the involvement of individuals who architected the monolithic application, or with special knowledge regarding the legacy architecture of the monolithic application. Generally, when converting a monolithic (legacy) application from the legacy technology to microservices, understanding that many such legacy applications can be written using languages such as C/C++, in existing approaches, human expertise could be needed while moving the monolithic application to a more current and/or efficient technology stack which suits microservices (e.g., Java. Spring Boot, Node, etc.). This human expertise would be best received from the individuals who worked on the initial monolithic application, but they may no longer available. For example, the architect who created the application could no longer be with the organization. As illustrated in FIG. 1, embodiments of the present invention circumvent this need by including program code that extracts the bounded context and defines the service cognitively.

FIG. 1 also illustrates that program code in embodiments of the present invention analyzes a business document and/or codebase of a monolithic application, automatically (110-120). In existing approaches, this type of analysis can be performed by subject matters experts (SMEs) who understand the business. These existing approaches therefore rely on the availability of SMEs and if these individuals are not available, it is very difficult to go through requirements documents and understand the functionality in order to carve out microservices, manually. In embodiments of the present invention, not only does the program code automatically carve out the microservices, the also automates the business requirements analysis.

Figure 2:
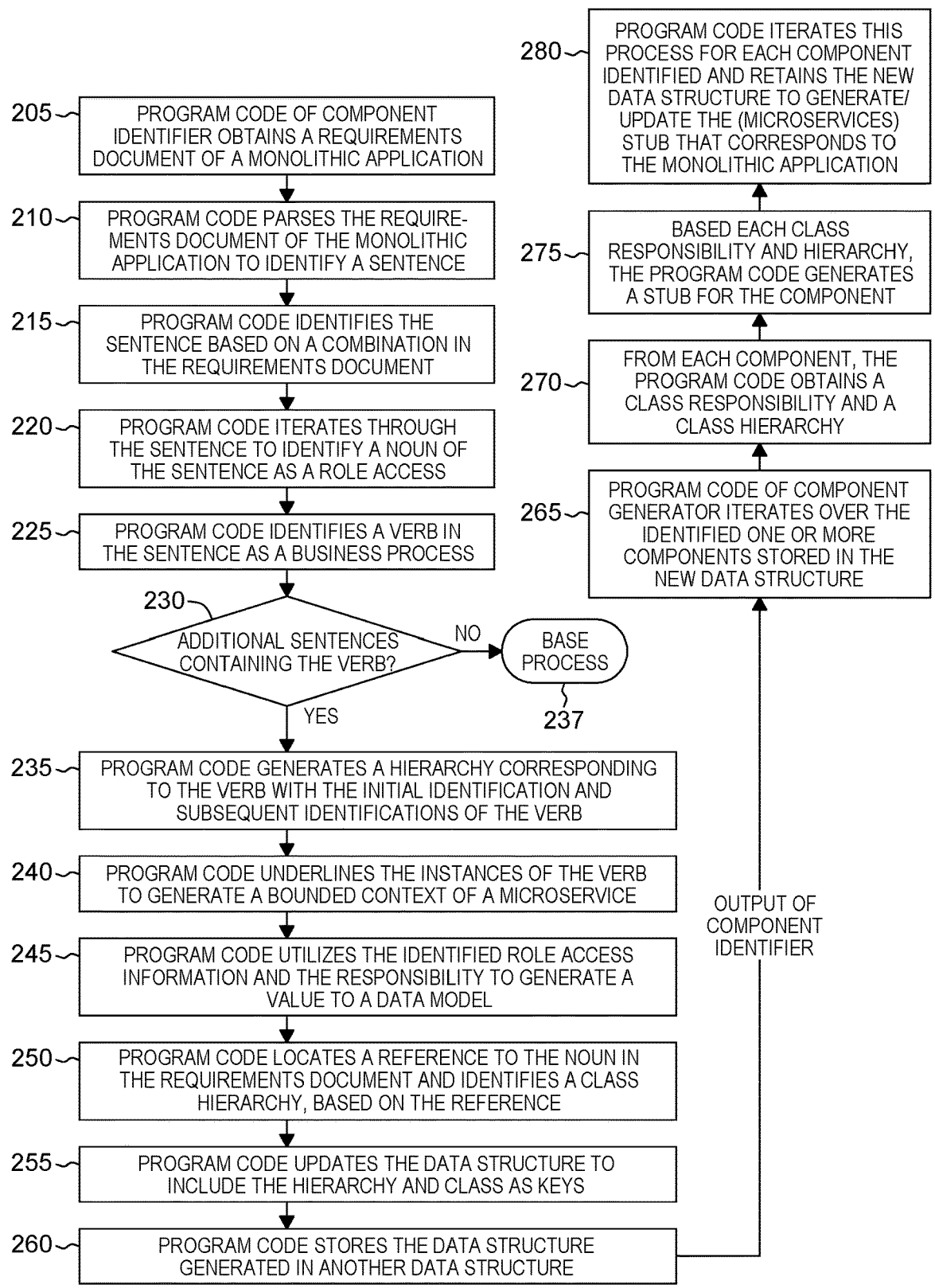
FIG. 2 is a workflow that illustrates certain aspects of some embodiments of the present invention.

FIG. 2 is a workflow 200 that provides additional detail on certain aspects of the functionality of the program code in some embodiments of the present invention. As illustrated in FIG. 2, the program code can be understood to complete two distinct functions in order to automatically identify microservices to provide the functionality of a monolithic application and generate a stub to enable a user to access these microservices, as the user would the monolithic application. The program code in embodiments of the present invention can comprise: 1) a component identifier; 2) a component generator; and/or 3) a machine learning engine. Program code comprising the component identifier, which can be an ASCII based component identifier and can identify business components of a monolithic application, obtains requirements of a monolithic application and extracts and classifies the business components (functionalities) of the monolithic application. Program code comprising the component generator, analyzes the classifications and analysis of the component identifier, determines which microservices correspond to the components, and generates a stub to enable access to the microservices. Program code comprising the machine learning engine monitors (with the prior permission and/or with the feedback of the user) the functionality of the stub in place of the monolithic application and improves the identification process based on the feedback/observation(s).

Figure 3:
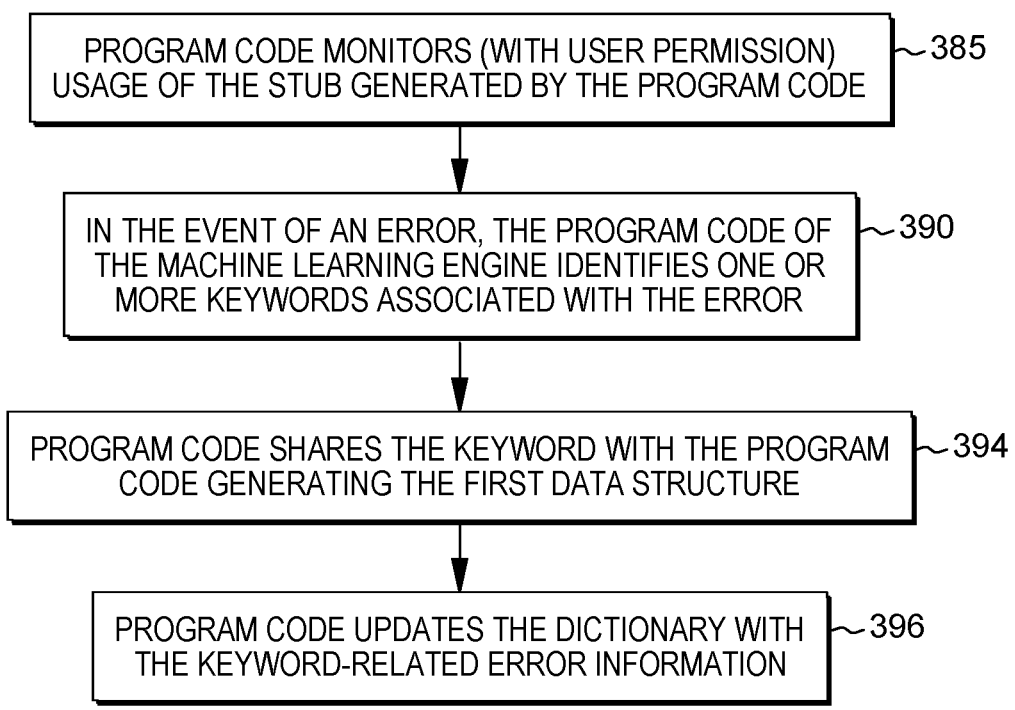
FIG. 3 is a workflow that illustrates certain aspects of some embodiments of the present invention.

As aforementioned, FIG. 2 is a workflow 200 that illustrates the functionalities of the program code in embodiments of the present invention. FIG. 2 separates the functionalities of the program code for illustrative purposes only. The program code with different functionality can be implemented as one or more modules regardless of where the functionality is resident in the code. However, the separation of the functionality in this particular manner, which can be implemented in some embodiments of the present invention, clarifies the workflow 200 for ease of understanding. Specifically, FIG. 2 separates the workflow 200 into tasks accomplished by program code comprising a component identifier and program code comprising a component generator. FIG. 3 illustrates an additional portion of the workflow 300 of embodiments of the present invention that involved aspects performed by program code comprising the machine learning engine. For ease of understanding, the functionality of each component is discussed separately.

First, referring to FIG. 2, regarding the component identifier, as illustrated in the workflow 200, program code comprising the component identifier (which is an ASCII based business component identifier in some embodiments of the present invention), executing on one or more processors, obtains a requirements document of a monolithic application (e.g., from a user) (205). In some embodiments of the present invention, the requirements document can comprise one or more hashtags. The presence of a hashtag serves as an override for the sentence-based analysis herein as a hashtag can indicate an intent for an execution level and override a default rule set (e.g., established by a dictionary and revisions of the dictionary with program code of the machine learning engine). By utilizing a hashtag, a hint is provided to the program code regarding a business component for a monolithic application, enabling the program code to more easily automatically identify one or more microservices with functionality comparable to the hashtagged requirement. Thus, in some embodiments of the present invention, the program code checks for requirements with hashtags and excludes these components from the sentence-based analysis.

Returning to FIG. 2, the program code parses the requirements document of the monolithic application to identify a sentence (210). In some embodiments of the present invention, the program code identifies the sentence based on a combination in the requirements document (215). In some embodiments of the present invention, the combination is an ASCII combination. However, depending on the format of the requirements document, the program code can utilize various existing cognitive agents (e.g., Watson) and natural language processing (NLP) algorithms to parse the requirements document to identify the sentence. In some embodiments of the present invention, the program code utilizes an industry-specific dictionary to determine if a combination in the requirements document comprises a complete sentence. For example, the program code can access an ASCII dictionary that is specific to the industry in which the monolithic application is utilized in order to identify sentences in the requirements document.

Returning to FIG. 2, the program code iterates through the sentence to identify a noun of the sentence as a role access (220). The program code identifies a verb in the sentence as a business process (225). Upon identifying the verb (i.e., business process), the program code parses the requirements document to locate additional sentences containing the verb (230). If the program code locates additional sentences that contain the verb, the program code generates a hierarchy corresponding to the verb with the initial identification and subsequent identifications of the verb (235). If the program code does not locate additional sentences that contain the verb (i.e., there are no additional references in the document) the program code identifies the verb as a base process (237). Returning to the circumstance in which the program code locates additional sentences that contain the verb, the program code underlines the instances of the verb to generate (define) a bounded context of a microservice (240). The program code utilizes the identified role access information and the responsibility to generate a value to a data model, including but not limited to, a map (245). In some embodiments of the present invention, in the map, the program code stores the data as key-value pairs, with the role access information as the key and the responsibility as the value.

Returning to FIG. 2, the program code locates a reference to the noun (role access, class) in the requirements document and identifies a class hierarchy, based on the reference (250). The program code updates the data structure (e.g., map) to include the hierarchy and class as keys (255). In some embodiments of the present invention, the data model is two separate maps, generated by the program code. The first map comprises role access information (i.e., class) and responsibilities, as key-value pairs, while the second map comprises hierarchy and class data as keys. In some embodiments of the present invention, the program code stores the data structure generated (e.g., the map or maps) in another data structure (e.g., another map) (260). The new data structure in which the program code stores the data structure generated by the component identifier comprising a component name and its details. As described herein, based on storing the data produced by the program code of the component identifier (i.e., an identification of a component) in the new data structure, the program code obtains (discovers) one or more microservice components from the (now defined) requirement(s) of the monolith application. In some embodiments of the present invention, depending upon the program code's analysis of the monolithic application, the program code can store multiple identified components in the new data structure (which accessed by the component generator, as explained below).

Second, regarding the program code comprising the component generator, as illustrated in FIG. 2, the program code comprising the component generator utilizes the output of the component identifier (i.e., the component identification) to generate one or more stubs enabling a user to access microservices comprising the functionality of the monolithic application. In some embodiments of the present invention, the program code of the component generator iterates over the identified one or more components stored in the new data structure (265). From each component, the program code obtains a class responsibility and a class hierarchy (270). Based each class responsibility and hierarchy, the program code generates a stub for the component (275). The program code iterates this process for each component identified and retains the new data structure to generate/update the (microservices) stub that corresponds to the monolithic application (280).

Regarding the third component, referring to FIG. 3, the program code comprising the machine learning engine continually trains (and improves) the sentence identification by the program code of the component identifier. As explained above, the program code parses the requirements document of the monolithic application to identify a sentence (210, FIG. 2). It is the identification of this sentence that enables the program code (based on the process illustrated in FIGS. 1-2) to create the first data structure (e.g., map) that enables the program code of the component identifier to identify one or more components, from which the program code of the component generator can generate a stub to relevant microservices (280, FIG. 2). In some embodiments of the present invention, the program code identifies the sentence based on a combination in the requirements document (215, FIG. 2) and in order to make this identification, the program code utilizes a data dictionary. As explained above, the sentence can comprise an ASCII combination and the program code utilizes an industry-specific dictionary to determine if a combination in the requirements document comprises a complete sentence. Thus, the completeness and accuracy of this dictionary can contribute to the efficacy of the stub to the microservices. In order to provide increasingly accurate sentence identifications, the program code monitors (with user permission) usage of the stub generated by the program code (385). In the event of an error, the program code of the machine learning engine identifies one or more keywords associated with the error (390). The program code shares the keyword with the program code generating the first data structure (e.g., mapping the sentences in the first map) (394). The program code updates the dictionary with the keyword-related error information (396). Thus, the error can be avoided by the program code in future sentence identifications in requirements documents. Thus, embodiments of the present invention are self-learning and efficacy increases with use. The example of an ASCII dictionary is provided for illustrative purposes only. In other embodiments of the present invention, the cognitive agents and/or NLP processing algorithms which analyze the requirements document can also be tuned by the program code based on the program code determining that an error has occurred. The error can potentially indicate an issue with a mapping of a keyword that is verb and/or noun to a business process and/or role access (respectively) which can be avoided moving forward based on updating the mapping functionality with the error data.

Figure 4:
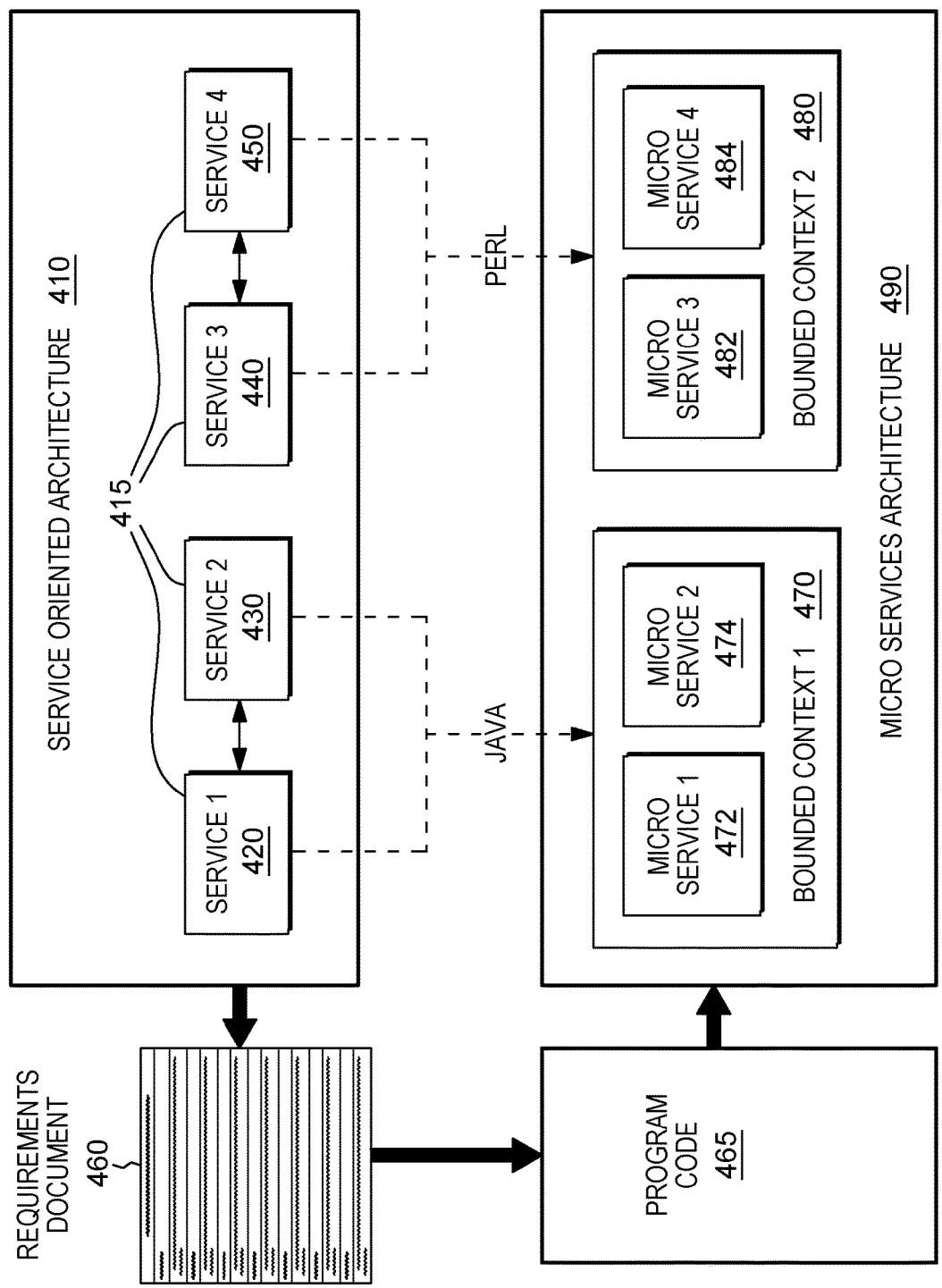
FIG. 4 depicts a technical environment into which various aspects of some embodiments of the present invention can be implemented.

FIG. 4 is a technical architecture 400 into which aspects of some embodiments of the present invention can be implemented. The technical environment 400 comprises a service oriented architecture 410 (e.g., C++) upon which a monolithic (legacy) application 415 is installed that provides to users four services 420 430 440 450. The functionality of the monolithic application 415 is encapsulated in a requirements document 460 obtained by program code 465 of an embodiment of the present invention executing on at least one processor. The program code 465, as illustrated in FIGS. 1-2 determines the components of the monolithic application 415, establishing bounded contexts 470 480 for the components, and automatically identifies one or more microservices 472 474 482 484 within the bounded contexts 470 480 that provide the functionality of the monolithic application 415 within the microservices architecture 490 (e.g., a shared computing environment, including but not limited to a cloud computing environment). Utilizing the program code 465 in embodiments of the present invention to automatically identify microservices 472 474 482 484 in a microservices architecture 490 for use in place of a monolithic application 415 enables the replacement of a monolithic application 415 provided by a service oriented architecture 410 at a low infrastructure cost. As illustrated in FIG. 4, the individual microservices 472 474 482 484 that the user can access via the stub generated by the program code 465 can be generated in different languages. This approach to monolithic application 415 conversion/migration imposes no skill set limitations and the analysis by the program code and the migration is automatic (e.g., instant). As illustrated in FIG. 4 the first and second microservices 472 474 within the first bounded context 470 provide functionality equivalent to the first and second services 420 430 of the monolithic application 415 and the functionality of the third and fourth services 440 450 of the monolithic application 415 is provided by the first and second microservices 482 484 within the second bounded context 480 of the microservices architecture 490.

Figure 5A:
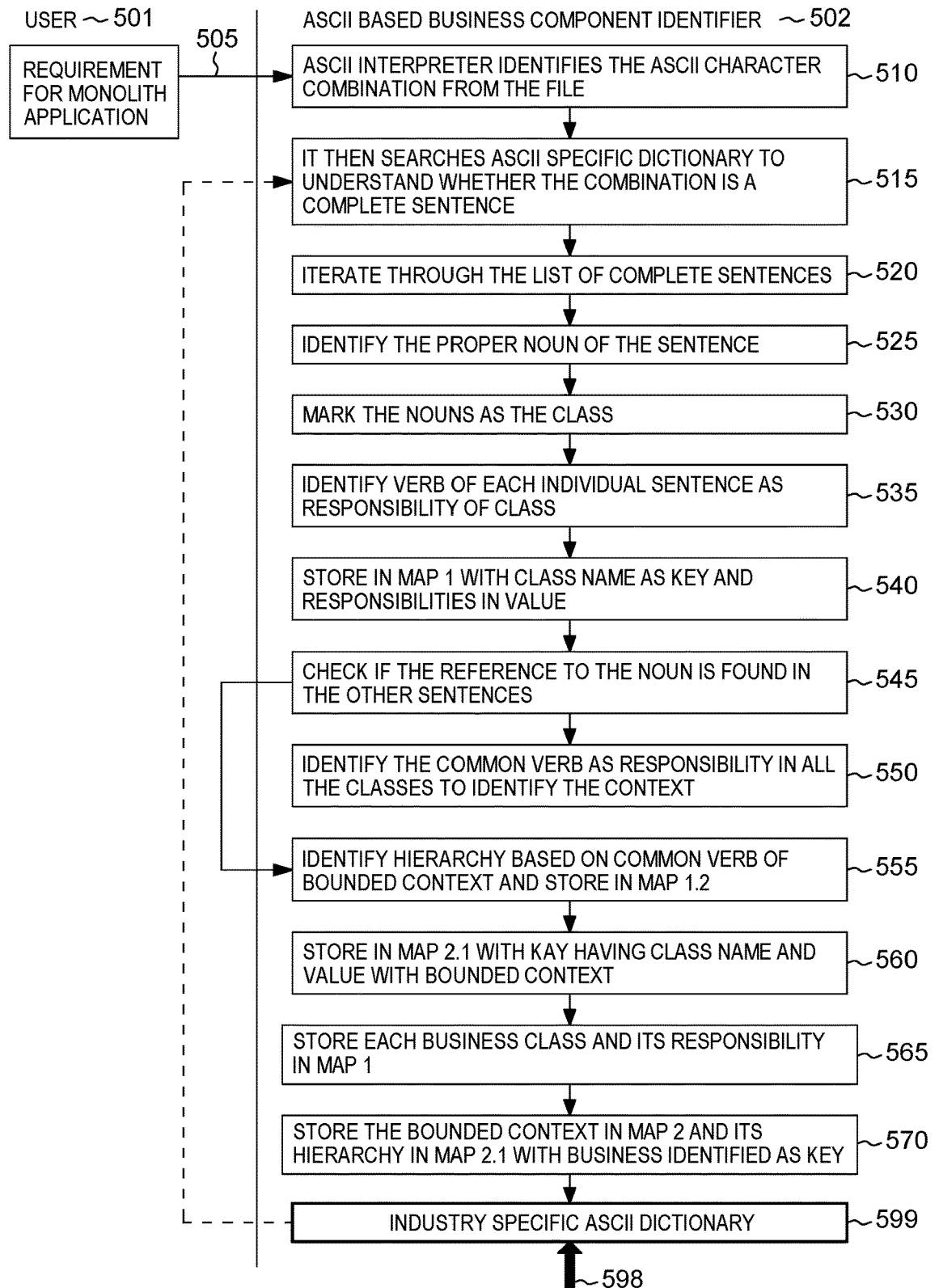
FIGS. 5A-5B are a workflow that illustrates certain aspects of some embodiments of the present invention.
Figure 5B:
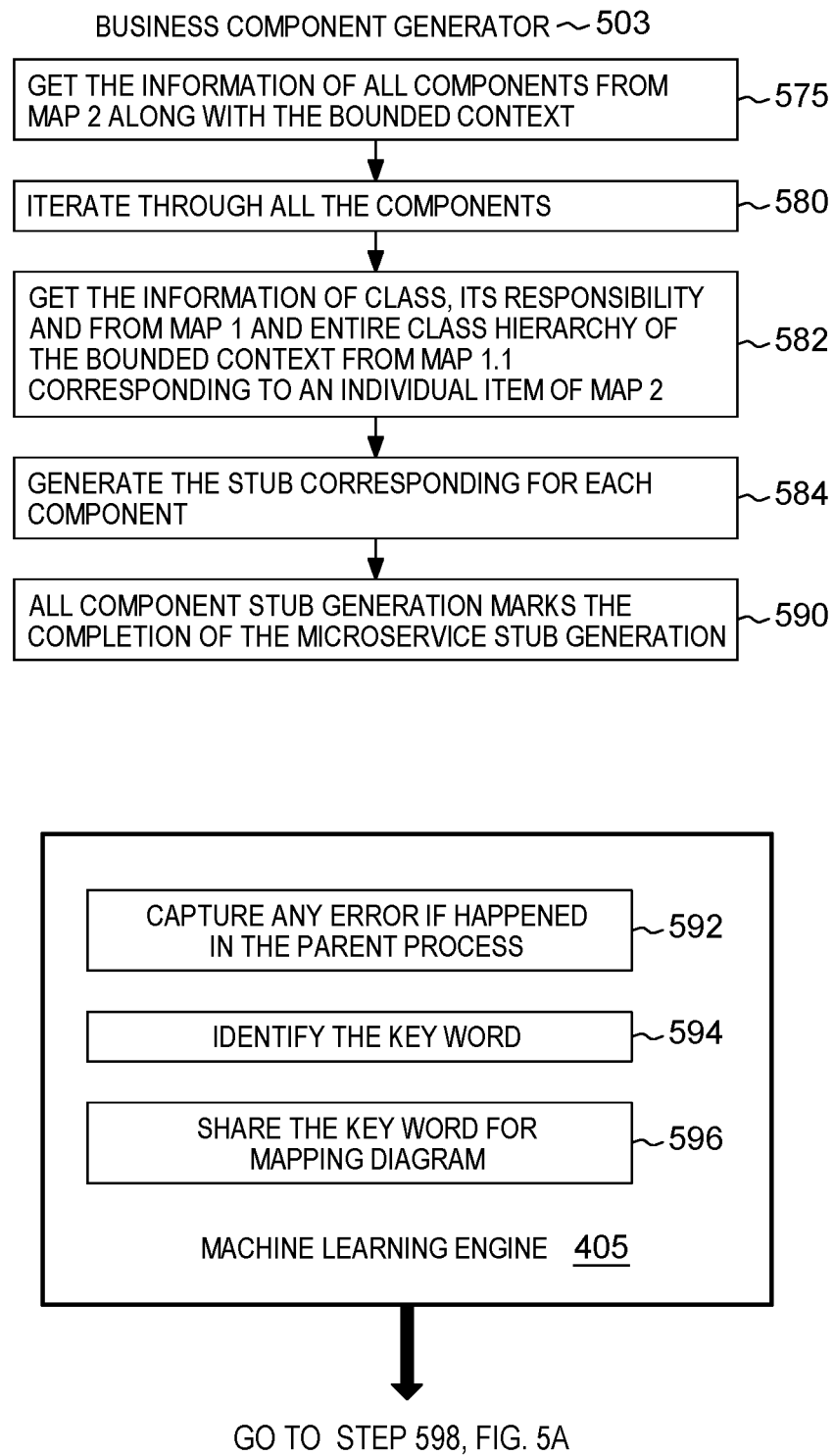

FIGS. 5A-5B are a workflow 500 that illustrates embodiments of the present invention that utilize ASCII in the analysis by the program code, thus employing an ASCII dictionary for identification of components within the requirements of a monolithic application. The ASCII-specific examples depicted in FIG. 5 are provided for illustrative purposes only and not to impose any limitations, merely to assist in visualizing aspects of some embodiments of the present invention. As with FIG. 2 and FIG. 3, for the sake of clarity rather than to limit the technical architecture of the program code, the functionality of the program code is separated into various modules and/or components. The various functions of the various components can executed concurrently and/or sequentially, depending upon the implementation of the aspects of embodiments of the present invention.

Referring to FIGS. 5A-5B, in some embodiments of the present invention, program code executing on at least one processor (comprising an ASCII based business component identifier 502) obtains, from a user 501, via a client, a file comprising a requirement for a monolithic application (505). In some embodiments of the present invention, the file comprises an ASCII-based requirements document. The program code comprising the ASCII based business component identifier 502 identifies ASCII character combinations in the file (510). In some embodiments of the present invention, the program code searches a specific ASCII dictionary 599 (a most recently updated version obtained from program code comprising a machine learning engine 504), to determine if one or more combinations of characters in the file comprise complete sentences (515). The dictionary can be specific to the industry in which the monolithic application is utilized. The program code iterates through the complete sentences (520) for each sentence: 1) to identify the proper noun of the sentence (525); 2) to mark the identified proper noun as a class (530); 3) to identify the verb of the sentence as a responsibility of the class (535); and 4) to store the class and responsibility in a data structure (e.g., a first data map) as a key (class name) and value (class responsibility) pair (540). The elements of the sentences, the class and responsibilities identified by the program code, comprise components of the monolithic application.

In some embodiments of the present invention, the program code filters the identified sentences such that a portion of the identified sentences remain and this portion comprises sentences with nouns in common with other sentences (545). For the portion of the sentences, the program code separates the portion into subgroups, wherein each subgroup comprises a common verb. The subgroups comprising a common verb and the classes (nouns) of the sentences with the common verbs comprise the contexts for the responsibility represented by the common verb (in each subgroup), which the program code identifies (550). The program code generates a hierarchy of responsibilities and classes based on these subgroups to generate a bounded context for each class (555). The program code stores the class name (key) and bounded context (value) as key value pairs in a second data structure (e.g., a second data map) (560). The first data structure can be referred to as Map 1 and the second data structure can be referred to as Map 1.2.

In some embodiments of the present invention, the program code comprising the ASCII based business component identifier 502 stores components in two additional data structures (e.g., data maps Map 2 and Map 2.1). In one embodiment of the present invention, the program code stores in a Map 2.1 data structure, key value pairs of a class name (key) and a bounded context (value). As aforementioned, the program code can store each class (noun) and its responsibility (verb) in a Map 1 data structure. The program code stores the bounded context in a third data structure (e.g., Map 2) (565) and the program code stores the hierarchy in a further data structure (e.g., Map 2.1) with a business identified as a key for this data structure (570).

As illustrated in FIGS. 5A-5B, in some embodiments of the present invention, program code comprising a business component generator 503 obtains data from one or more of the data structures generated by the program code of the component identifier 502 (575). For example, the program code can obtain data from the Map 2 data structures with the bounded context. The program code iterates through the components identified by the program code (580) (as retained in one or more of the data structures) to generate a microservice stub (590) which comprises stubs for each component, thus, for each component, the program code: 1) gets data comprising the class, responsibility, and the entire class hierarchy of the bounded context (582); 2) generates a stub (584). In some embodiments of the present invention, the program code obtains the class and responsibility data from the first data structure (e.g., Map 1) and the class hierarchy of the bounded context from the second data structure (e.g., Map 1.2). The program code obtains the class, responsibility, and hierarchy, based on this data corresponding to an individual item in the third data structure (e.g., Map 2).

As discussed above, program code comprising the ASCII based business component identifier 502 obtains a recently updated version of an ASCII dictionary 599 from program code comprising the machine learning engine 504. This program code continuously updates this dictionary by monitoring (with user permission) utilization of the one or more microservices launched by the user via the microservice stub generated by the program code. In an embodiment of the present invention, the program code comprising the machine learning engine 504 captures an error occurring during utilization of the microservices via the microservices stub (592). Based on capturing an error, the program code identifies a keyword associated with the error (594). The program code provides the keyword to the ASCII based business component identifier 502 (596). The program code updates the ASCII dictionary 599 (used for sentence identification) based on the keyword (598).

Embodiments of the present invention include a computer-implemented method, a computer program product, and a computer system, where program code executing on one or more processors obtains a requirement for a monolithic application, where the requirement comprises one or more components defining services accessed by a user, via a client computing device, based on launching the monolithic application. The program code automatically identifies, based on a sentence comprising the requirement, a given component of the one or more components, based on analyzing the requirement of the monolithic application. The program code determines, based on syntax of the sentence, an initial class and a responsibility for the given component. The program code generates a bounded context for the given component based on analyzing one or more additional sentences comprising the requirement to identify additional classes beyond the initial class associated with the responsibility in the requirement. The program code identifies, in a microservices architecture executing in a shared computing environment, one or more microservices within the bounded context. The program code generates a stub for use by the user, via the client, for accessing the one or more identified microservices to perform the services.

In some embodiments of the present invention, the program code deploys the stub to a graphical user interface accessible by the user, via the client.

In some embodiments of the present invention, wherein the program code determining, based on the syntax of the sentence, the initial class and the responsibility for the given component comprises: the program code accessing a dictionary defining the syntax. The program code utilizing the dictionary to verify that the sentence is a full sentence. Based on the verifying, the program code determines that a proper noun in the sentence comprises the initial class and that a verb in the sentence comprises the responsibility.

In some embodiments of the present invention, a format of requirement is American Standard Code for Information Interchange (ASCII).

In some embodiments of the present invention, the dictionary is an ASCII-based dictionary.

In some embodiments of the present invention, the program code generating the bounded context further comprises: the program code determining a class hierarchy based on the additional classes and the initial class identified in the requirement, where each class of the initial class and the additional classes represents a role accessing the given component, and where the class hierarchy is determined based on a totality of roles accessing the given component, based on the requirement; and the program code generating the bounded context based on the class hierarchy.

In some embodiments of the present invention, the program code retains the class hierarchy and the bounded context for the given component in a data structure.

In some embodiments of the present invention, the program code identifying the one or more microservices within the bounded context comprises the program code accessing the data structure.

In some embodiments of the present invention, the program code determines that the user has accessed the stub in the graphical user interface, via the client. The program code monitors execution of the one or more microservices based on the accessed stub.

In some embodiments of the present invention, the program code determines, based on the monitoring that an error has occurred. The program code identifies a keyword associated with the error. The program code updates the dictionary to reflect the error associated with the keyword.

In some embodiments of the present invention, the program code identifies in the requirement, a hashtag associated with another component, wherein the hashtag indicates an intent of the other component. The program code, based on the hashtag, automatically identifies, in the microservices architecture executing in the shared computing environment, a new one or more microservices associated with the intent. The program code updates the stub to provide access to the new one or more microservices in addition to the one or more identified microservices to perform the services.

Referring now to FIG. 6, a schematic of an example of a computing node, which can be a cloud computing node 10. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove. In an embodiment of the present invention, the one or more processors executing the program code 465 (FIG. 4) and the one or more computing resources comprising the microservice architecture 490 (FIG. 4) can comprise a cloud computing node 10 (FIG. 6) and if not a cloud computing node 10, then one or more general computing nodes that include aspects of the cloud computing node 10.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 12 that can be utilized as cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs). Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
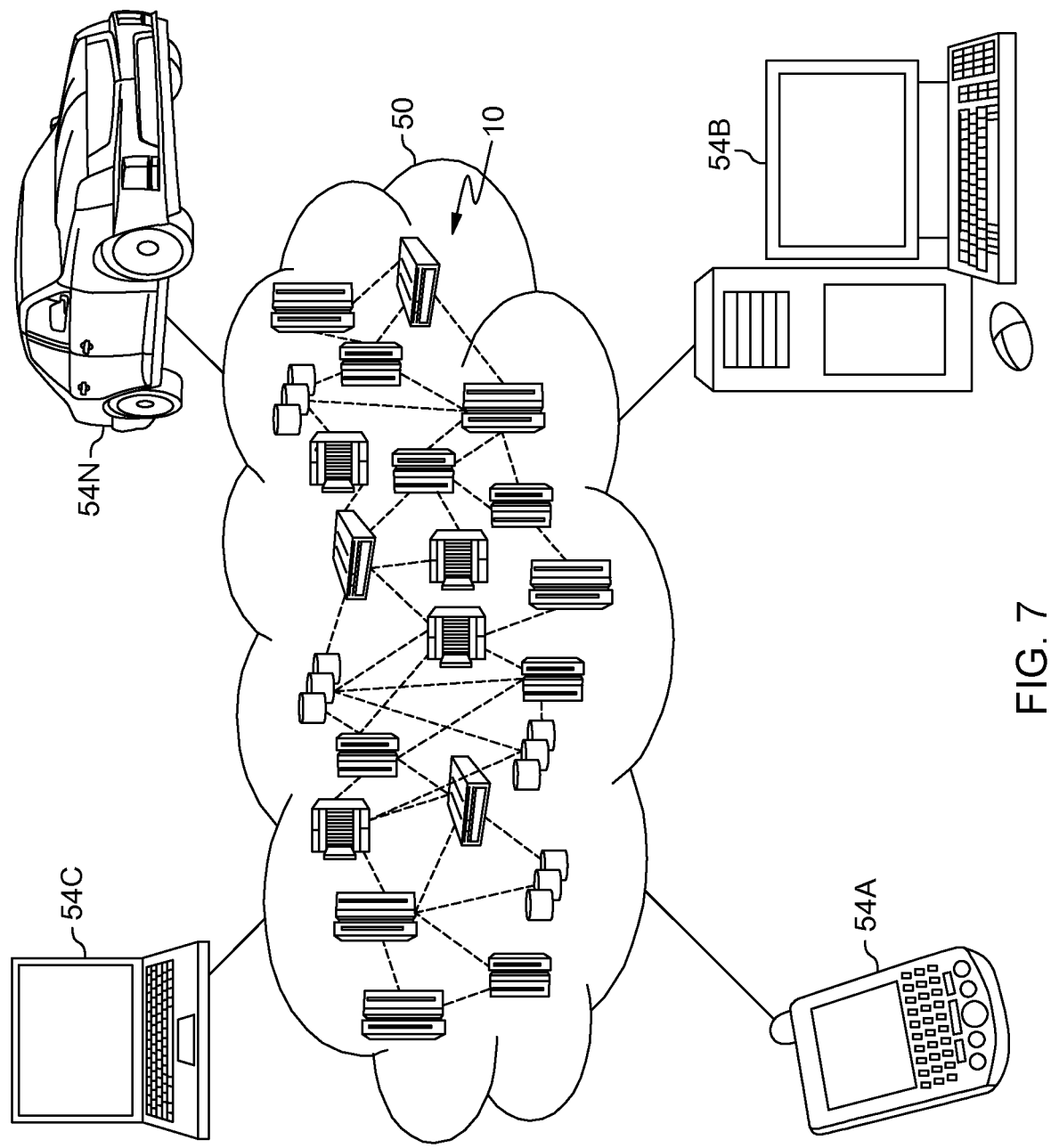
FIG. 7 depicts a cloud computing environment according to an embodiment of the present invention.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
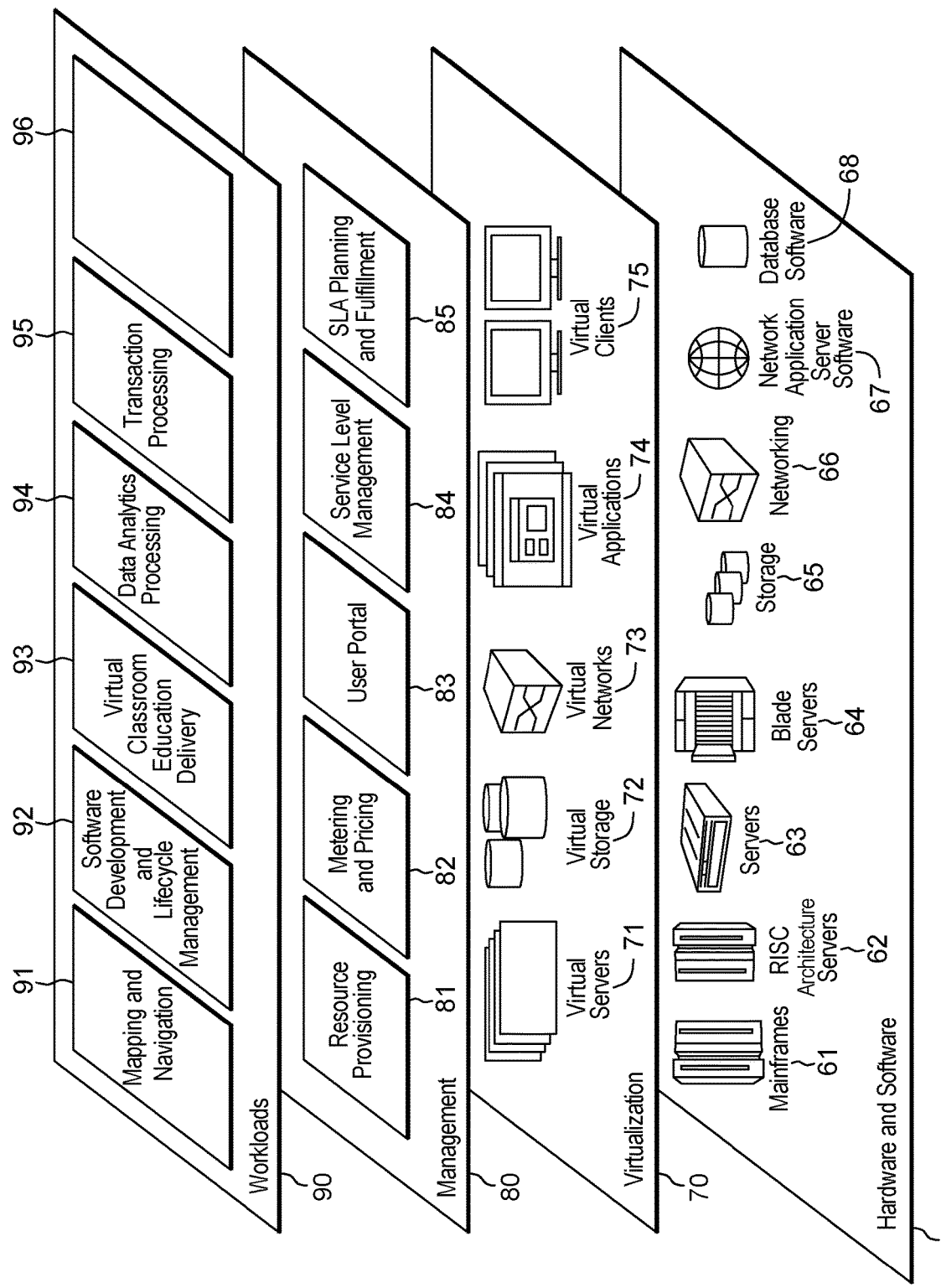
FIG. 8 depicts abstraction model layers according to an embodiment of the present invention.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and enabling microservice access through token enhancement and aggregation 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method, comprising:
    obtaining, by one or mere processors, a requirement for a monolithic application, wherein the requirement comprises one or more components defining services accessed by a user, via a client computing device, based on launching the monolithic application;
    automatically identifying, by the one or more processors, based on a sentence comprising the requirement, a given component of the one or more components, based on analyzing the requirement of the monolithic application;
    determining, by the one or more processors, based on syntax of the sentence, an initial class and a responsibility for the given component;
    generating, by the one or more processors, a bounded context for the given component based on analyzing one or more additional sentences comprising the requirement to identify additional classes beyond the initial class associated with the responsibility in the requirement wherein generating the bounded context further comprises:
        determining, by the one or more processors, a class hierarchy based on the additional classes and the initial class identified in the requirement, wherein each class of the initial class and the additional classes represents a role accessing the given component, and wherein the class hierarchy is determined based on a totality of roles accessing the given component, based on the requirement; and
        generating, by the one or more processors, the bounded context based on the class hierarchy;
    identifying, by the one or more processors, in a microservices architecture executing in a shared computing environment, one or more microservices within the bounded context; and
    generating, by the one or more processors, a stub for use by the user, via the client, for accessing the one or more identified microservices to perform the services.

2. The computer-implemented method of claim 1, further comprising:
    deploying, by the one or more processors, the stub to a graphical user interlace accessible by the user, via the client.

3. The computer-implemented method of claim 2, wherein determining, based on the syntax of the sentence, the initial class and the responsibility for the given component comprises:
    accessing, by the one or more processors, a dictionary defining the syntax;
    utilizing, by the one or more processors, the dictionary to verify that the sentence is a full sentence; and
    based on the verifying, determining that a proper noun in the sentence comprises the initial class and that a verb in the sentence comprises the responsibility.

4. The computer-implemented method of claim 3, wherein a format of requirement is American Standard Code for Information Interchange (ASCII).

5. The computer-implemented method of claim 1, wherein the dictionary is an ASCII-based dictionary.

6. The computer-implemented method of claim 1, further comprising:
    retaining, by the one or more processors, the class hierarchy and the bounded context for the given component in a data structure.

7. The computer-implemented method of claim 6, wherein identifying the one or more microservices within the bounded context comprises accessing the data structure.

8. The computer-implemented method of claim 3, further comprising:
    determining, by the one or more processors, that the user has accessed the stub in the graphical user interface, via the client; and
    monitoring, by the one or more processors, execution of the one or more microservices based on the accessed stub.

9. The computer-implemented method of claim 8, further comprising:
    determining, based on the monitoring, by the one or more processors, that an error has occurred;
    identifying, by the one or more processors, a keyword associated with the error; and
    updating, by the one or more processors, the dictionary to reflect the error associated with the keyword.

10. The computer-implemented method of claim 1, further comprising:
    identifying, by the one or more processors, in the requirement, a hashtag associated with another component, wherein the hashtag indicates an intent of the other component; and
    based on the hashtag, automatically identifying in the microservices architecture executing in the shared computing environment, a new one or more microservices associated with the intent; and
    updating, by the one or more processors, the stub to provide access to the new one or more microservices in addition to the one or more identified microservices to perform the services.

11. A computer program product comprising:
a computer readable storage medium readable by one or more processors of a shared computing environment and storing instructions for execution by the one or more processors for performing a method comprising:
  obtaining, by one or more processors, a requirement for a monolithic application, wherein the requirement comprises one or more components defining services accessed by a user, via a client computing device, based on launching the monolithic application;
  automatically identifying, by the one or more processors, based on a sentence comprising the requirement, a given component of the one or more components, based on analyzing the requirement of the monolithic application;
  determining, by the one or more processors, based on syntax of the sentence, an initial class and a responsibility for the given component;
  generating, by the one or more processors, a bounded context for the given component based on analyzing one or more additional sentences comprising the requirement to identify additional classes beyond the initial class associated with the responsibility in the requirement wherein generating the bounded context further comprises:
    determining, by the one or more processors, a class hierarchy based on the additional classes and the initial class identified in the requirement, wherein each class of the initial class and the additional classes represents a role accessing the given component, and wherein the class hierarchy is determined based on a totality of roles accessing the given component, based on the requirement; and
    generating, by the one or more processors, the bounded context based on the class hierarchy;
  identifying, by the one or more processors, in a microservices architecture executing in a shared computing environment, one or more microservices within the bounded context; and
  generating, by the one or more processors, a stub for use by the user, via the client, for accessing the one or more identified microservices to perform the services.

12. The computer program product of claim 11, the method further comprising:
  deploying, by the one or more processors, the stub to a graphical user interface accessible by the user, via the client.

13. The computer program product of claim 12, wherein determining, based on the syntax of the sentence, the initial class and the responsibility for the given component comprises:
  accessing, by the one or more processors, a dictionary defining the syntax;
  utilizing, by the one or more processors, the dictionary to verify that the sentence is a full sentence; and
  based on the verifying, determining that a proper noun in the sentence comprises the initial class and that a verb in the sentence comprises the responsibility.

14. The computer program product of claim 13, wherein a format of requirement is American Standard Code for Information Interchange (ASCII).

15. The computer program product of claim 14, wherein the dictionary is an ASCII-based dictionary.

16. The computer program product of claim 11, the method further comprising:
  retaining, by the one or more processors, the class hierarchy and the bounded context for the given component in a data structure.

17. The computer program product of claim 16, wherein identifying the one or more microservices within the bounded context comprises accessing the data structure.

18. A computer system comprising:
  a memory;
  one or more processors in communication with the memory;
  program instructions executable by the one or more processors in a shared computing environment via the memory to perform a method, the method comprising:
    obtaining, by the one or more processors, a requirement for a monolithic application, wherein the requirement comprises one or more components defining services accessed by a user, via a client computing device, based on launching the monolithic application;
    automatically identifying, by the one or more processors, based on a sentence comprising the requirement, a given component of the one or more components, based on analyzing the requirement of the monolithic application;
    determining, by the one or more processors, based on syntax of the sentence, an initial class and a responsibility for the given component;
    generating, by the one or more processors, a bounded context for the given component based on analyzing one or more additional sentences comprising the requirement to identify additional classes beyond the initial class associated with the responsibility in the requirement wherein generating the bounded context further comprises:
      determining, by the one or more processors, a class hierarchy based on the additional classes and the initial class identified in the requirement, wherein each class of the initial class and the additional classes represents a role accessing the given component, and wherein the class hierarchy is determined based on a totality of roles accessing the given component, based on the requirement; and
      generating, by the one or more processors, the bounded context based on the class hierarchy;
    identifying, by the one or more processors, in a microservices architecture executing in a shared computing environment, one or more microservices within the bounded context; and
    generating, by the one or more processors, a stub for use by the user, via the client, for accessing the one or more identified microservices to perform the services.

* * * * *